United States Patent [19]
van der Lely

[11] 3,995,909
[45] Dec. 7, 1976

[54] VEHICLE ANTI-SKID MECHANISMS

[76] Inventor: Cornelis van der Lely, 7, Bruschenrain, Zug, Switzerland

[22] Filed: Jan. 8, 1975

[21] Appl. No.: 539,504

[30] Foreign Application Priority Data

Jan. 15, 1974 Netherlands ............ 7400507

[52] U.S. Cl. .................. 301/47; 180/15; 280/28.5
[51] Int. Cl.² .................. B60B 15/26
[58] Field of Search ............ 180/15, 16, 1 R; 280/28.5; 301/47, 46

[56] References Cited

UNITED STATES PATENTS

| | | | |
|---|---|---|---|
| 2,044,812 | 6/1936 | Roessel | 301/47 |
| 2,249,138 | 7/1941 | Hill | 301/47 |
| 2,443,261 | 6/1948 | Maxwell | 301/47 |
| 2,610,898 | 9/1952 | Smith | 301/47 |
| 2,899,241 | 8/1959 | Colin | 301/47 |
| 3,005,663 | 10/1961 | Lee | 301/47 |
| 3,112,138 | 11/1963 | Kauer | 301/47 |
| 3,695,727 | 10/1972 | Sesky | 180/15 |

FOREIGN PATENTS OR APPLICATIONS

| | | | |
|---|---|---|---|
| 474,326 | 3/1929 | Germany | 301/47 |
| 1,159,295 | 12/1963 | Germany | 301/47 |
| 912,860 | 12/1962 | United Kingdom | 301/47 |

Primary Examiner—M. H. Wood, Jr.
Assistant Examiner—John P. Silverstrim
Attorney, Agent, or Firm—Mason, Mason & Albright

[57] ABSTRACT

A vehicle anti-skid mechanism is a wheel attachment and fits on the outside of a vehicle wheel. The mechanism includes a central portion having an inner pair of plates between an outer pair of plates and tread members pivoted to each pair of plates. Turning the inner pair of plates relative to the outer plates displaces active portions of the tread members outwardly to more or less ground engaging positions. The tread members define the periphery of the mechanism and are configured to interfit with one another in their withdrawn inoperative positions. Hydraulic piston assemblies are mounted around the hub of the mechanism and connected to the inner pair of plates.

28 Claims, 5 Drawing Figures

U.S. Patent  Dec. 7, 1976  Sheet 1 of 3  3,995,909

VEHICLE ANTI-SKID MECHANISMS

According to one aspect of the invention, there is provided a vehicle anti-skid mechanism of the kind set forth, wherein, when said members are in their inoperative positions, they extend in substantially adjoining relationship when viewed radially with respect to the longitudinal axis of said wheel-shaped assembly.

Figure 1:
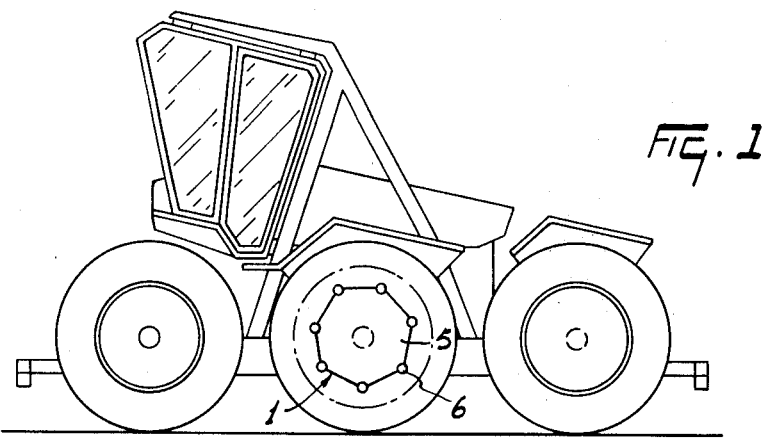
Figure 3:
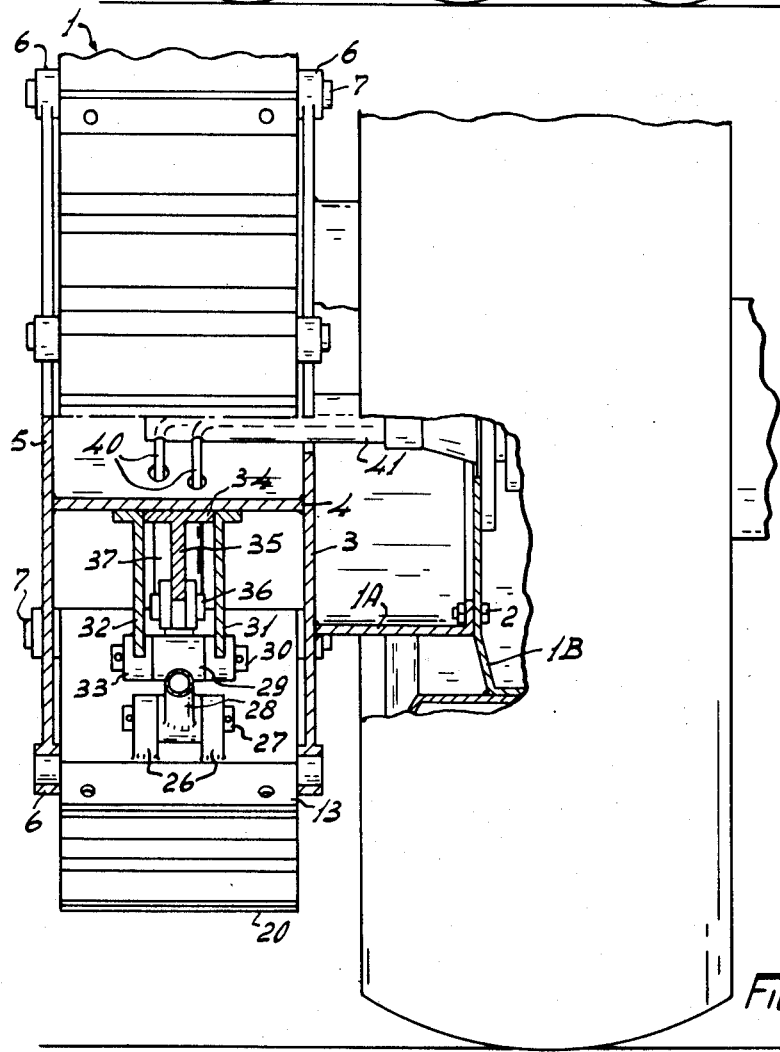
Figure 2:
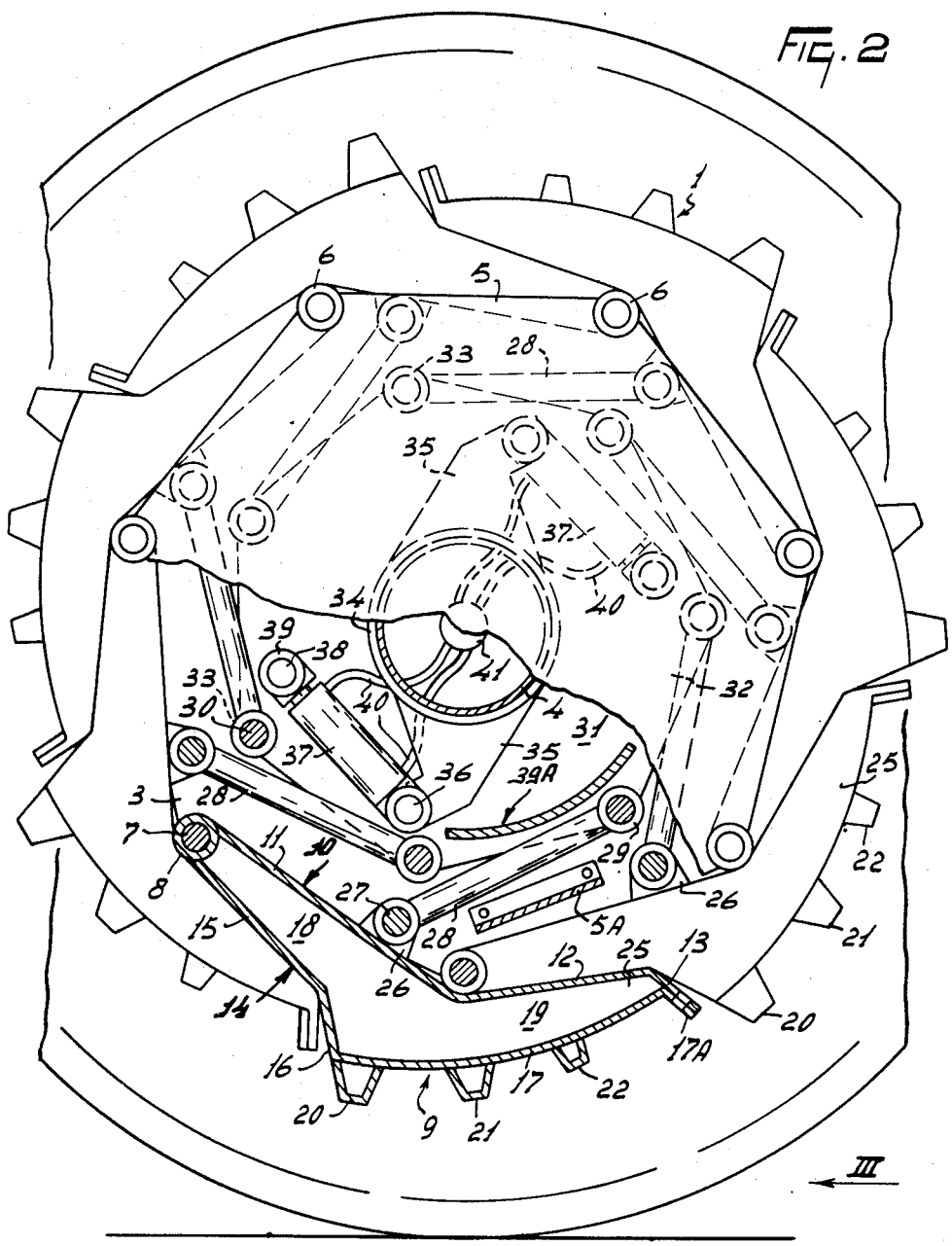
Figure 4:
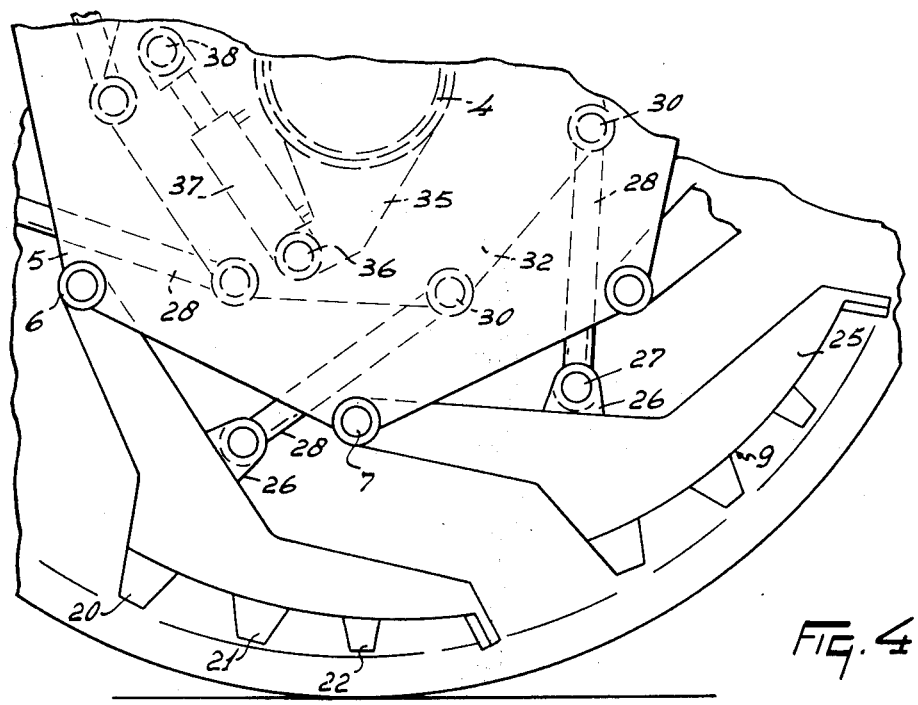
Figure 5:
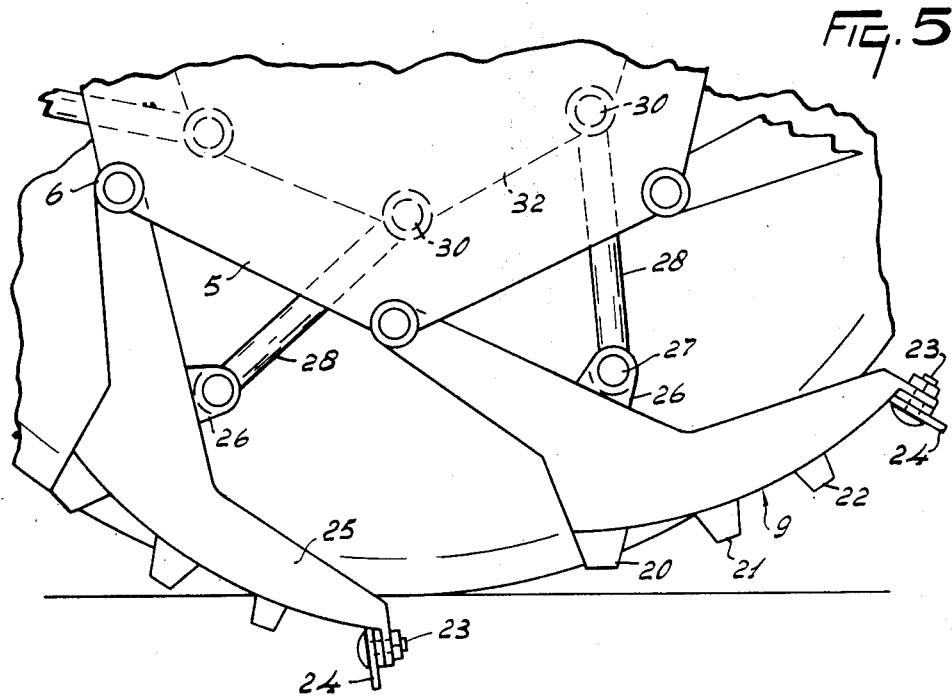

For a better understanding of the invention, and to show how the same may be carried into effect, reference will now be made, by way of example, to the accompanying drawings, in which:

FIG. 1 is a side elevation illustrating an agricultural tractor provided with vehicle anti-skid mechanism in accordance with the invention, FIG. 2 is a part-sectional side elevation illustrating a wheel of the tractor of FIG. 1 and the anti-skid mechanism that is connected thereto to an enlarged scale and in greater detail, said mechanism being disposed in an inoperative position, FIG. 3 is a part-sectional elevation as seen in the direction indicated by an arrow III in FIG. 2, FIG. 4 is a side elevation of a lower region of the wheel and mechanism that can be seen in FIG. 2, said mechanism being in an intermediate operative position, and FIG. 5 is a similar view to FIG. 4 but shows said mechanism in an operative position of maximum effect.

Referring to the accompanying drawings, the vehicle which is illustrated in FIG. 1 thereof as an example of a vehicle with which an anti-skid mechanism in accordance with the invention may usefully be employed is an agricultural tractor that has three pairs of large ground wheels that are disposed at the opposite sides of the body of the tractor in such a way that there is a front wheel, a rear wheel and a middle or central wheel at each side of the tractor. In the embodiment which is illustrated, each of the pair of middle or central wheels is provided with a corresponding anti-skid mechanism which is generally indicated by the reference 1. The two mechanisms 1 are substantially symmetrically identical and, accordingly, only one of them is illustrated in the drawings and only that illustrated mechanism will be described. As will be evident from the drawings, the mechanism 1 is essentially an assembly of wheel-shaped configuration and it is connected by a cylindrical support 1A whose longitudinal axis is coincident with the axis of rotation of the corresponding tractor wheel to a hub portion 1B of that wheel by bolts 2. The end of the cylindrical support 1A that is remote from the hub portion 1B has a plate 3 welded or otherwise rigidly secured to it in such a way that the plate 3 is disposed substantially perpendicular to the longitudinal axis of the support 1A. One end of a cylindrical hub 4 of the mechanism 1 is welded or otherwise rigidly secured to the side of the plate 3 that is remote from the cylindrical support 1A, the arrangement being such that the longitudinal axis of the hub 4 is also substantially coincident with the longitudinal axis of the support 1A. A further plate 5 that is parallel to the plate 3 is welded or otherwise rigidly secured to the end of the hub 4 that is remote from said plate 3. The assembly is strengthened by connecting pieces 5A (FIG. 2) which rigidly interconnect the plates 3 and 5 at locations spaced from the hub 4. The plates 3 and 5 form central portions of the mechanism 1 and are of substantially identical construction, each of the plates 3 and 5 being of regular heptagonal configuration. Short sleeve-like bearings 6 that define axes which are parallel to the longitudinal axis of the hub 4 are located in aligned pairs at the seven corners of each of the two plates 3 and 5 and strong pivot pins 7 are entered through the two bearings 6 of each pair. A sleeve 8 is turnable about the corresponding pivot pin 7 between the two bearings 6 of each pair, said sleeve 8 being rigidly mounted at one end of a corresponding hollow supporting member or tread member 9.

Each supporting member or tread member 9 has inner and outer substantially flat side surfaces that are formed from sheet metal or other sheet material but the plates which afford the surfaces of the member 9 that extend parallel to the longitudinal axis of the hub 4 are bent to shapes which can be seen best towards the bottom of FIG. 2 of the drawings. The radially inner one of these two plates has a flat portion 11 which extends away from the corresponding sleeve 8 and which is then bent over to form a further flat portion 12 whose end, remote from the portion 11, is bent over again to form an outwardly projecting end portion 13 that is substantially parallel to the corresponding flat portion 11. The radially outer one of the two plates which has just been mentioned comprises a flat portion 15 which extends away from the corresponding sleeve 8 in gently divergent relationship with the flat portion 11 of the corresponding inner plate, said flat portion 15 being bent over outwardly to form a further short flat portion 16. A sharp bend interconnects the end of the portion 16 that is remote from the portion 15 and a cylindrically curved portion 17 whose convex side is directed outwardly with respect to the axis of the hub 4. The end of the curved portion 17 that is remote from its junction with the flat portion 16 is bent over outwardly to form a short end portion 17A that abuts against, and is fastened to, the end portion 13 of the corresponding inner plate. The inner and outer plate portions 11 and 15/16 together constitute a fastening portion 18 of the member 9 whereas the remaining portions of those plates together constitute an active or tread portion 19 which portion 19, it will be noted, is generally foot-shaped having a toe region which is afforded by the plate end portions 13 and 17A. The fastening portion 18 and the active or tread portion 19 are of substantially equal lengths and are inclined to one another at an angle which is substantially the angle of relative inclination between the flat portions 11 and 12 of the inner plate of the member 9, that angle being an obtuse angle whose magnitude is substantially equal to the angle contained between the two straight edges at each of the seven corners of the heptagonal plates 3 and 5.

The fastening portion 18 extends rearwardly away from the corresponding sleeve 8 with respect to the intended direction of rotation of the corresponding ground wheel for forward travel of the tractor, said portion 18 being disposed in substantially tangential relationship with an imaginary cylindrical figure whose longitudinal axis is coincident with the axis of the hub 4 at times when the anti-skid mechanism 1 is in the inoperative position thereof that is illustrated in FIGS. 1, 2 and 3 of the drawings. In this inoperative position, the cylindrically curved portion 17 of each member 9 is so disposed that its center of curvature is substantially coincident with the axis of the hub 4. The outer convex surface of each portion 17 is provided with three ribs 20, 21 and 22 that each extend substantially parallel to the axis of the hub 4 and each of which is of substantially trapezoidal cross-section. The three ribs 20, 21 and 22 are disposed one behind the other, in spaced apart relationship, with respect to the intended direction of rotation for forward travel of the tractor ground wheel to which the anti-skid mechanism 1 is attached and it will be seen from FIG. 2, in particular, of the drawings that the three ribs 20, 21 and 22 are of progressively decreasing cross-sectional area, the leading rib 20 with respect to said direction being the one which has the largest cross-sectional area. The bent over end portions 13 and 17A of the two shaped plates 10 and 14 forming the inner and outer sides respectively of each member 9, also project outwardly from the convex surface of the corresponding portion 17 at a location spaced behind the rearmost and smallest rib 22 with respect to the direction of rotation that has been mentioned above. A wear-resistant plate 24 (FIG. 5) can be detachably fastened to each of the pairs of plate end portions 13 and 17A by bolts 23 entered through holes in those portions. In the embodiment which is being described, the sheet-form sides of each supporting member or tread member 9 are afforded by metal plates 25 that extend substantially perpendicular to the longitudinal axis of the hub 4 at the opposite edges of the inner and outer shaped plates which also afford the members 9. The flat portion 11 of the inner shaped plate of each member 9 is provided substantially, but not exactly, midway between the corresponding sleeve 8 and the corresponding flat portion 12 with a pair of spaced apart lugs 26 that are directed generally inwardly towards the hub 4. Aligned bearing holes are formed in the two lugs 26 of each pair and these bearing holes receive a corresponding pin 27 about which one end of a corresponding setting arm 28 is pivotable between the lugs 26. The opposite end of each setting arm 28 carries a sleeve 29 which is pivotable about a pin 30 relative to two second central portions 31 and 32 of the mechanism 1, said second central portions 31 and 32 being spaced apart from one another in a direction parallel to the axis of the hub 4 and being smaller in size than the first-mentioned central portions that are afforded by the plates 3 and 5. The central portions 31 and 32 are also afforded by plates whose outer edges define regular heptagons, the pivot pins 30 that have been mentioned above being received in substantially horizontally aligned sleeve bearings 33 that are carried in pairs at the seven corners of the two central portions 31 and 32. The sleeves 29 at the ends of the setting arms 28 are located around the pins 30 between the two sleeve bearings 33 of each pair. It will be seen from FIG. 3 of the drawings, in particular, that the portions 31 and 32 have central holes with perpendicularly bent over cylindrical rims which are turnably arranged around the outer surface of the hub 4. A ring 34 that is fixed to the hub 4 also surrounds that hub and is located between the central portions 31 and 32. Two symmetrically identical brackets 35 project outwardly from the convex outer surface of the ring 34 at two locations which are spaced apart from one another by 180° around the axis of the hub 4. The outer ends of the two brackets 35 are pivotally connected by pins 36 to the base ends of the cylinders 37 of corresponding double-acting piston and cylinder units. The free ends of the piston rods of said piston and cylinder units are connected by sleeve bearings 39 to pivot pins 38, those pivot pins 38 being rigidly mounted between the central portions 31 and 32 at two diametrically opposite locations that are both spaced by equal distances from the longitudinal axis of the hub 4.

It will be seen from FIG. 2 of the drawings that the two piston and cylinder units that include the cylinders 37 are disposed with their longitudinal axes substantially parallel to one another. As previously mentioned, each of the piston and cylinder units is of double-acting formation and it will be seen from the drawings that two flexible ducts 40 communicate with opposite end regions of each cylinder 37, said ducts 40 extending from the cylinders 37 through holes in the wall of the hub 4 and thence into a tube 41 that is located centrally in the hub 4 and that extends from that hub through the cylindrical support 1A to allow the ducts 40 which are located therein to communicate operatively in a manner that is not illustrated in the drawings with the hydraulic system of the tractor by way of appropriate controls.

In the use of a tractor fitted with anti-skid mechanisms of the kind that have been described and that are illustrated in the accompanying drawings, hydraulic controls that are accessible to the tractor driver can be operated to cause extension of the piston rods of the two piston and cylinder assemblies from their cylinders 37. At least three different positions of each mechanism 1 are possible in accordance with the degree of extension, or lack of it, of said piston rods that is brought about. A first inoperative position is shown in FIGS. 1 to 3 of the drawings in which position the piston rods are substantially fully withdrawn into the cylinders 37 so that the active or tread portions 19 of the supporting members or tread members 9 are all located radially inwardly from the treads of the adjacent tractor wheels by considerable distances. The active or tread portions 19 are thus located well above the ground surface even when they are at their lowermost points in their paths of rotation. This inoperative position is employed for normal road travel of the tractor and in working circumstances where very little, if any, skidding will occur. It will be noted from FIG. 2 of the drawings that, in this inoperative position, consecutive members 9 around the axis of the hub 4 partially overlap one another with the inner flat portion 12 of each active or tread portion 19 in abutting relationship with the outer flat portion 15 of the fastening portion 18 of the next member 9 around the axis of the hub 4. With this disposition of the seven members 9 of each mechanism 1, the end portions 13 and 17A of the shaped plates of each member 9 are located alongside the flat portion 16 of the next member 9 around the axis of the hub 4, that is to say, substantially in the obtuse-angled bend between the flat portion 16 which has just been mentioned and the corresponding flat portion 15. As will be evident from FIGS. 2 and 3, in particular, of the drawings, the active or tread portions 19 of the members 9 do not project radially outwardly to a sufficient extent to constitute a hazard to other traffic and will not cause damage to the road surface at places such as hump-back bridges and the like in any but the most exceptional circumstances. The mechanisms 1 project axially beyond the ground wheels of the tractor to only a relatively small extent and do not present any outwardly directed parts that would be likely to worsen the damage or injury that could possibly be caused by a laterally glancing collision or "sideswipe."

Partial extension of the piston rods corresponding to the two cylinders 37 will cause the ring 34 and plate-like central portions 31 and 32 to turn angularly about the hub 4 in a clockwise direction as seen in FIG. 2 of the drawings and this movement is transmitted by the setting arms 28 to the corresponding seven supporting members or tread members 9. Those members 9 are thus all angularly displaced to substantially the same extent about the corresponding pivot pins 7 to bring them to an intermediate operative position such as the one that is shown in FIG. 4 of the drawings. In the position illustrated in FIG. 4 of the drawings, the cylindrically curved portions 17 of the seven members 9 of each mechanism 1 are so disposed that their central axes of curvature are coincident, or very nearly coincident, with the longitudinal axis of the hub 4 and, as will be apparent from a consideration of FIG. 3 of the drawings, said members 9 effectively broaden the treads of the two ground wheels of the tractor alongside which the mechanisms 1 are located so that additional support is provided on soft ground and deep rut formation by the tractor ground wheels is avoided or very significantly reduced.

FIG. 5 of the drawings illustrates an operative position of maximum effect in which the piston rods corresponding to the cylinders 37 are extended from those cylinders throughout the full lengths of their strokes with the result that the ring 34 is displaced further around the hub 4 and the members 9 are turned outwardly about the axes of the pivot pins 7 to their full extent. In this operative position, the detachable wear-resistant plates 24 and the toe portions of the members 9 to which they are secured are located further from the axis of the hub 4 than are the ribs 20, 21 and 22 which ribs, however, are also located (in part in the case of each rib 20) further from the axis of the hub 4 than is the tread surface of the tire of the associated tractor ground wheel. The plates 24, the parts which carry them, and the ribs 20, 21 and 22 thus exert a very strong grip on the ground surface and strongly oppose skidding of the tractor.

Since each of the supporting members or tread members 9 is of hollow formation, the anti-skid mechanisms 1 need not be very heavy so that the total weight of the tractor is not greatly increased. The sheet metal construction of the members 9 enables them to be manufactured quickly and easily in an inexpensive manner that nevertheless facilitates the provision of anti-skid mechanisms 1 that are both simple and effective without being prohibitively expensive. The mechanisms 1 can be employed for increasing the effective tread area of the ground wheels with which they are associated and also for positively gripping the ground to reduce any tendency to skidding due to the ready adjustability thereof that is provided. Moreover, the mechanisms are neither dangerous nor obtrusive when they are retained in their inoperative positions. Although an agricultural tractor has been described as one example of a vehicle to which the invention can advantageously be applied, it is emphasised that mechanisms in accordance with the invention can equally well be used with other vehicles that are subject to the danger of skidding.

Although various features of the anti-skid mechanism that has been described, and that is illustrated in the accompanying drawings, will be set forth in the following claims as inventive features, it is emphasised that the invention is not necessarily limited to those features and that it includes within its scope each of the parts of the mechanism that has been described and/or illustrated in the accompanying drawings both individually and in various combinations.

What I claim is:

1. A traction attachment for a vehicle wheel having a hub, said attachment comprising a central portion connected to said hub; a plurality of tread members, each of said tread members including an inner fastening portion pivotally mounted to said central portion and an outer tread portion connected to said inner fastening portion; and setting means interconnecting said central portion and each of said fastening portions for simultaneously pivoting all of said tread members between an inoperative, withdrawn position and operative, ground engaging positions; each of said fastening portions including an outer flat portion and each of said tread portions including an inner flat portion, said inner flat portion of each tread member being in abutting relationship with said outer flat portion of an adjacent tread member in said inoperative withdrawn position whereby said tread members form a closed wall around said central portion; said setting means including at least one hydraulic piston and cylinder assembly housed within said central portion.

2. A traction attachment as claimed in claim 1, including a fixed pivot for pivotally mounting each of said fastening portions to said central portion.

3. A traction attachment as claimed in claim 2, said setting means further including a setting arm pivotally connected between said central portion and each of said tread members at a position spaced from said fixed pivot.

4. A mechanism as claimed in claim 3, wherein said tread portions have radially outer free ends that comprise portions inclined to the remainders of said tread portions.

5. A mechanism as claimed in claim 3, wherein the fixed pivots are located in substantially regularly spaced apart relationship around the outer periphery of said central portion.

6. A mechanism as claimed in claim 5, wherein said central portion includes a first inner part and a second part, said fixed pivots being carried by said second part.

7. A mechanism as claimed in claim 6, wherein said first part has a smaller periphery than said second part.

8. A mechanism as claimed in claim 7, wherein said parts each comprise spaced apart plates with polygonal peripheries.

9. A mechanism as claimed in claim 8, wherein said peripheries are each of regular polygonal shape.

10. A mechanism as claimed in claim 9, wherein said fastening portions and said setting arms are pivotally connected to the corners of the regular polygonal second and first parts respectively.

11. A traction attachment as claimed in claim 8 wherein said first inner part is angularly adjustable about said hub and pivotally connected to said setting arms.

12. A traction attachment as claimed in claim 11 wherein said piston and cylinder assembly adjusts the position of said first inner part.

13. A mechanism as claimed in claim 12, wherein two hydraulic piston and cylinder assemblies are angularly spaced from one another and located at opposite sides of the center point of said hub.

14. A mechanism as claimed in claim 13, wherein the longitudinal axes of said hydraulic piston and cylinder assemblies extend substantially parallel to one another.

15. A mechanism as claimed in claim 13, wherein the piston rod of each hydraulic piston and cylinder assembly is connected to said inner plates.

16. A mechanism as claimed in claim 11, wherein each setting arm is pivotally connected to a corresponding tread member at a location substantially midway along the length of the latter.

17. A mechanism as claimed in claim 1, wherein said members are settable as a unit in an intermediate operative position between said inoperative position and said operative position, the latter position being attained when said members are pivoted outwardly about their corresponding pivot axes to a maximum possible extent.

18. A mechanism as claimed in claim 1, wherein a front region of each fastening portion with respect to the direction of rotation of said wheel for forward travel, has a recess which receives a bent-over free end of an immediately neighbouring tread member when said members are in their inoperative positions.

19. A mechanism as claimed in claim 1, wherein the radially outer surface of each tread portion is of outwardly convex configuration.

20. A mechanism as claimed in claim 19, wherein each tread member is settable in an intermediate operative position in which said convex surface has a center of curvature substantially coincident with the axis of rotation of said wheel.

21. A vehicle anti-skid mechanism comprising an attachment for a vehicle wheel having a hub, said mechanism being a wheel-shaped assembly of tread members pivoted to a central portion and a first polygonal part of said portion being rotatable about an axis, means connected to turn said first part about said axis and pivot said tread members about corresponding fixed pivots on a second polygonal part of the central portion outwardly with respect to said axis, each tread member having a foot-shaped tread portion and a fastening portion, the angle of inclination between each fastening portion and corresponding tread portion being an obtuse angle directed towards the axis of rotation of said assembly, said angle being about equal in magnitude to the angular corners of said second part.

22. A mechanism as claimed in claim 21, wherein each fastening portion is of substantially the same length as each tread portion.

23. A mechanism as claimed in claim 21, wherein the radially outer surface of the tread portion of each tread member has at least one rib.

24. A mechanism as claimed in claim 23, wherein a plurality of ribs are arranged one behind the other in respect of each tread portion and relative to the normal direction of forward rotation of said assembly.

25. A mechanism as claimed in claim 24, wherein said ribs are substantially parallel to one another.

26. A mechanism as claimed in claim 24, wherein the cross-sectional areas of said ribs progressively decrease in magnitude from the leading rib to the rearmost rib relative to said direction of forward rotation.

27. An anti-skid wheel-shaped attachment and mechanism for a vehicle wheel having a hub, said mechanism comprising an assembly of tread members pivoted to a central portion and a part of said portion being rotatable about an axis, means connected to turn said part about said axis and pivot said members about corresponding fixed pivots on said central portion outwardly with respect to said axis, each tread member having a foot-shaped tread portion and a fastening portion, the free end of each tread portion being bent over to form a toe and said toe having a detachable wear-resistant plate.

28. A mechanism as claimed in claim 27, wherein the tread portion of each tread member extends rearwardly from a corresponding fastening portion with respect to the normal direction of rotation for forward travel of said assembly.

* * * * *